Aug. 2, 1932.  R. B. DERR  1,869,886
RECOVERY OF METAL FROM COATED METAL FOILS
Filed April 9, 1931
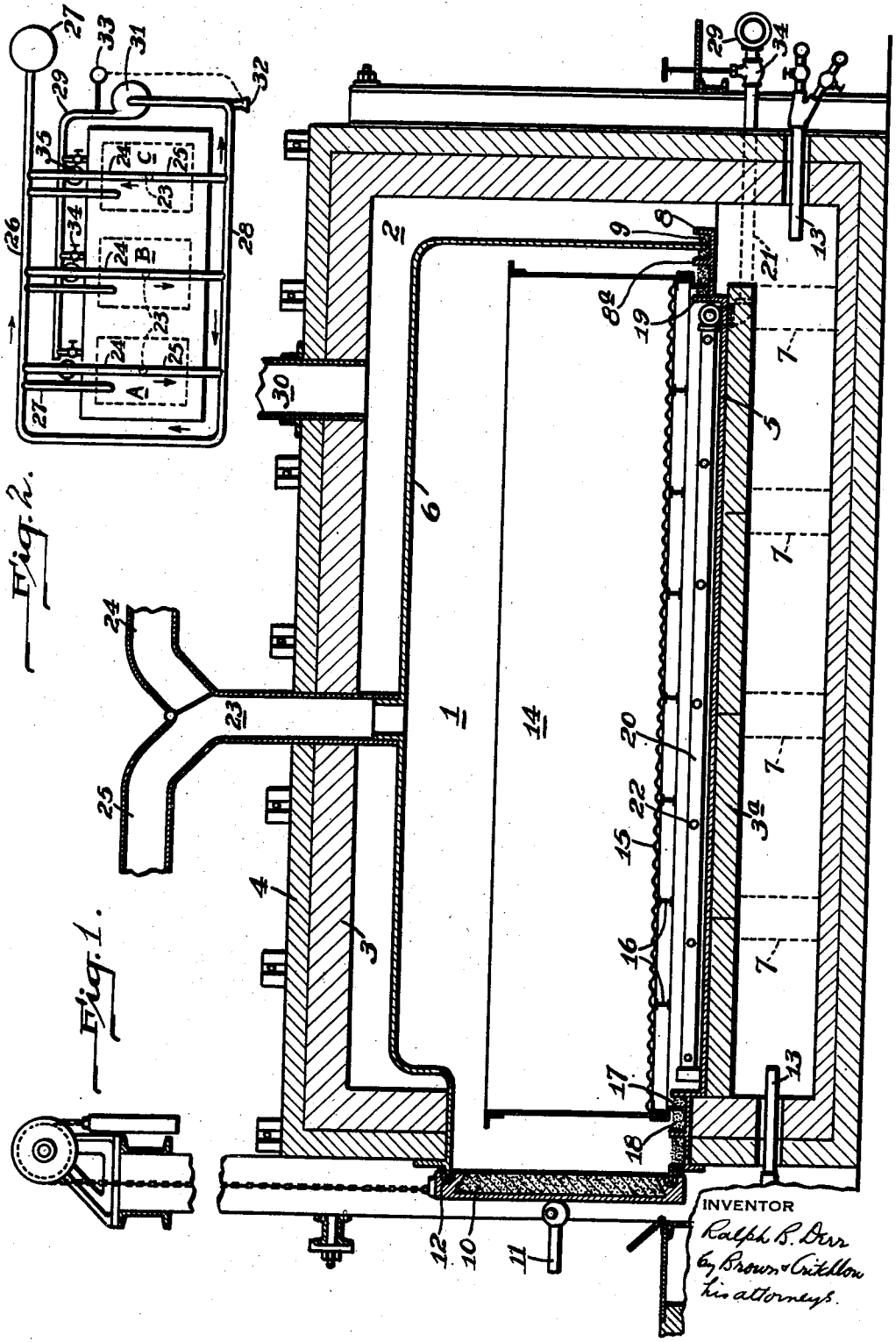
INVENTOR
Ralph B. Derr
by Brown & Critchlow
his attorneys.

Patented Aug. 2, 1932

1,869,886

UNITED STATES PATENT OFFICE

RALPH B. DERR, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA

RECOVERY OF METAL FROM COATED METAL FOILS

Application filed April 9, 1931. Serial No. 528,745.

This invention relates to the recovery of metals from coated metal foils, and particularly to the recovery of metallic aluminum from paper-backed or lacquered aluminum foil.

A large proportion of the metal foils now produced is prepared for use by being coated or backed with non-metallic materials. For example, much foil is backed with paper attached to the foil by an adhesive. The paper may be untreated, or it may be waxed, in which case the wax may act as an adhesive. The foils may be coated on one or both sides with other materials also, such as wax, lacquer or varnish. Large amounts of foil scrap coated with such non-metallic materials result annually from trimming and similar manufacturing operations.

Attempts to recover the foils from such scrap by washing the paper and other non-metallic material from these coated foils have been unsuccessful, because complete and satisfactory separation could not be effected. These coating materials are largely combustible, and attempts have been made also to burn the paper and other combustible matter from the foil. This procedure as practiced prior to this invention also has been quite unsatisfactory, largely because considerable amounts of carbonaceous matter remained with the foil, and because the residual metal was burned during treatment. Prior to my invention there has been available no practical and economical means for reclaiming the foil in such scrap. Its disposition, therefore, has been a serious problem.

A major object of this invention is to provide a process for recovering the metal from backed or coated foils, which removes all volatile and carbonaceous matter from the foil, avoids burning of the metal, is simple, economical, may be readily and positively controlled, provides a product that is clean, bright, and of uniform quality, and is especially adapted for the reclamation of aluminum foil from coated aluminum foil.

A further object of the invention is to provide an apparatus for use in the practice of the process, which is of simple construction, operates efficiently, and is readily used and controlled.

The invention may be described in connection with the accompanying drawing which shows the preferred form of apparatus used in the practice of the process. In the drawing Fig. 1 is a longitudinal sectional view through an apparatus adapted to carry out the invention; and Fig. 2 is a schematic plan view of a gas-circulating system.

The invention is predicated upon my discovery that paper, adhesive, wax, lacquers and the like non-metallic components of backed or coated foils may be removed readily and economically, and without burning the foil, by first distilling volatile combustible matter from the backed foil by heating it in a non-oxidizing atmosphere, and then burning off residual carbonaceous matter in an oxidizing atmosphere controlled in a manner presently to be described. The foil remains in a clean bright and directly utilizable condition.

The process, therefore, comprises two steps, or stages. In the first stage any wax and other volatile matter is distilled off, together with products of destructive distillation of the paper, adhesive, lacquers, wax and the like. My tests have shown that there then remains a residue of carbonaceous matter, which is burned off in the second stage under controlled oxidizing conditions. All such coating materials are, for brevity of reference, referred to herein as volatile matter. Also, whether backed with paper, or covered with lacquer, wax, or other non-metallic materials, the foils contemplated will be referred to hereinafter as coated foils.

In heating such backed foil in the presence of air the combustibles, for instance wax and paper, will ignite, causing burning of the foil as a result of the rapid and violent combustion. This makes the reclaimed foil unsatisfactory for further use. In contrast thereto the benefits of the process provided by this invention are due in part to removal of the volatile matter by heating the backed foil in a closed container from which oxidizing gases are excluded. By thus heating in a non-oxidizing atmosphere distillation of the volatile matter is effected without its combustion in contact with the metal.

The invention is predicated further upon my discovery that residual carbonaceous matter remaining after the first step may be removed without damage to the metal by continuing the heating while admitting air, or other oxidizing or oxygen-containing gas, so as to maintain an atmosphere of low oxygen content in contact with the metal. In other words, the oxidizing atmosphere in this stage is controlled to burn off the carbonaceous matter without burning the aluminum. In this stage the rate of gas supply is dependent in part upon the oxygen content of the gas supplied to the container, and upon the temperatures of the gas and metal.

The invention is applicable to the treatment of coated metal foils generally for separation of the metal from the non-metallic coating and backing materials. For purposes of description, and not by way of limitation, it will be described with particular reference to the reclamation of metallic aluminum from paper backed aluminum foil, for which use the invention is especially adapted.

In the treatment of aluminum foil both steps are conducted preferably at temperatures from about 800 to 1000° F. This range of temperature is suited to most coated aluminum foils and appears to provide the shortest treatment times consistent with good results. Lower or higher temperatures than these may, however, be found desirable under certain conditions, and for foils other than aluminum. The temperature should not exceed the melting point of the metal.

The oxidizing gas supplied in the second stage may be air, but my tests have shown that, in general, the rate of flow of pure air over the foil must be relatively low. Relatively high rates of flow are desirable in order to remove the heat from the foil more rapidly. Accordingly, it is preferable to obtain the desired low oxygen atmosphere by mixing air with an inert gas, as by using a flue gas of controlled oxygen content. Satisfactory results are had with a flue gas containing 5 to 8 percent of oxygen.

It is important that the atmosphere in the container during the first stage of the process be essentially non-oxidizing. No gas need be admitted, but it may be found desirable to introduce a non-oxidizing gas, such as carbon dioxide, to assist in carrying the heat to the foil mass, and more rapidly to carry off the volatile matter. Generally, in operating as described herein, about 85 to 90 percent of the combustible matter will be distilled off in the first stage.

The most satisfactory results are had by circulating the gas uniformly through the mass in the second stage. This is productive of uniformly clean bright foil, and it aids heat control, and shortens the treatment time. Also, the gases passed to the retort may be, and preferably are, pre-heated for instance to about the temperature of the foil undergoing treatment.

My tests have shown also that it is desirable to pack the foil scrap in the container, rather than inserting it loosely. Satisfactory results may be had with foil packed to a density of 0.75 to 1.25 pounds per cubic foot, the lower density being used with lighter foils.

Control of the process is accomplished by means of an apparatus embodying an externally heated gas-tight retort, in which the foil is treated, and which is provided with means for controlling the atmosphere in contact with the foil during treatment. Regulation of the atmosphere in the second stage is had most suitably by recirculation of gases from combustion of the carbonaceous matter in that stage.

The preferred embodiment of apparatus is shown in the accompanying drawing. Fig. 1 shows an apparatus comprising a gas-tight retort 1 disposed within a combustion chamber 2 built up in any suitable manner from refractory and insulating brick 3 and 4 respectively.

The retort comprises a rectangular base member 5 and an upper hood member 6 supported in grooves formed therein in such manner as to form a substantially gas-tight seal. To this end base 5 is provided with peripherally disposed upwardly extending flanges 8 and 8a spaced to form a groove 9 which receives the bottom of hood 6 and is filled with a sealing medium, such as sand. The base is mounted on a course of refractory brick 3a carried by pillars 7.

The hood is open at one end for charging, and this opening is closed by a door 10. In order to exclude air from the retort during distillation, door 10 is forced by cam levers 11 against asbestos rope packing 12 arranged in a groove in the door corresponding to the charging opening. A gas-tight seal is thus formed. This door may be mounted in any suitable manner, as for example by means of the counter-weighted mechanism shown.

The retort is fired externally by heat generated in the combustion chamber. In the apparatus shown burners 13 projecting into the combustion chamber below the base of the retort provide the necessary heat. These burners may use either gaseous fuel, or oil.

Removably disposed within the retort is a foil container, most suitably in the form of a basket 14 having a foraminous base, so that gas may be uniformly circulated upwardly through the foil. Basket 14 is formed from sheet metal sides and ends, suitably reinforced, and its bottom suitably consists of a sheet 15 of expanded metal carried on transverse supporting members 16. About the periphery of the bottom of the basket is connected a Z-bar 17 whose depending leg extends into a groove 18 formed peripherally of the retort base by a flange 19 disposed inwardly from flange 8a. This groove is also filled with a sealing medium, such as sand. This construction directs gas supplied below the basket upwardly through its contents in a manner productive of the best results.

The atmosphere in the retort is controlled by gas supplied from a manifold system carried by the retort base below the basket. The embodiment shown comprises headers 20 and 20a disposed longitudinally of the sides of the retort base and connected at one end to a gas supply line 21. The headers are connected by a parallel series of transverse pipes 22 perforated along their under sides to effect proper distribution of the gas uniformly over the entire area defined by the bottom of the basket.

Volatile matter distilled from the foil, and gaseous products of combustion formed in the second stage of the process pass from the retort into a 2-way valve 23 having branches 24 and 25. Branch 24 is connected to a flue 26 which leads to a stack 27, Fig. 2, and the other branch leads to a conduit 28 connected at one end to flue 26 and at the other end to a manifold 29 leading to gas lines 21. Products of combustion from burners 13 in the combustion chamber are withdrawn to flue 26 by a connection 30, Fig. 1.

The units just described permit of reclamation of foil in accordance with this invention. These units may be used singly, or a number may be built up into a combined structure, as indicated schematically in Fig. 2. The construction of the heating chamber or retort is such as to prevent any substantial leakage of air into it, and this is important in effecting the distillation stage. Control of the atmosphere in the retort thus is easy. During combustion of carbonaceous matter in the second stage of the process the flue gases contain carbon dioxide. In the preferred practice these gases are recirculated as a convenient means of controlling the oxidation in the manner set forth.

Such recirculation may be had by the piping layout shown in Fig. 2, for a three unit apparatus. The units are indicated by the letters A, B and C. The products of combustion or distillation, as the case may be, pass from the retorts to valves 23. Assuming that units A and B are operating in the second stage of the process, that is in the burning off of carbonaceous matter in a controlled oxygen-containing atmosphere, these units will require a mixture of flue gas and air in controlled proportions. Valves 23 of these two units are turned to direct the products of combustion into conduit 28, as shown by the arrows, Fig. 2. A portion of the gases flow to flue 26 and thence to the stack, another portion being drawn from conduit 28 by a blower 31. Air is also drawn into the blower through an inlet 32 in proportions adapted to provide the desired flue gas-air mixture. Such control may be effected by means of a $CO_2$ recorder controller indicated conventionally by the numeral 33. This recorder controller may be of any of the well known types, it being mounted in manifold 29 and controlling a valve in the air inlet. The mixture of flue gas and air is passed by the blower to manifold 29. Valves 34 at each unit control flow from the manifold to gas lines 21. Valves 34 in units A and B are opened, and the gas mixture is distributed through headers 20 and pipes 22 to the retorts.

Unit C is being used in the first, or distillation stage. The wax and other combustible matter may be permitted to burn outside of the retort. Preferably, however, the volatile products are drawn off through branch 24 and passed to stack 27 through flue 26. The wax may be separated from these gases, if desired, by an appropriate condenser 35. During this stage valve 34 for unit C is closed.

In case the volatile products are burned, this may be done by perforating the top of the retort and permitting the gases to burn in the furnace chamber outside of the retort. Such operation will provide sufficient heat to complete distillation, burners 13 being extinguished after the products have started to burn. Furthermore, by the use of a furnace of sufficient heat capacity, the chambers might be hot enough, after the first stage of the treatment, to maintain suitable temperatures throughout the second stage of the treatment, and to start distillation in an immediately following treatment. Thus, by suitable design of furnace and control of its continuous operation, the heat derived from the products of combustion may be so conserved that the supply of external heat becomes unnecessary once the furnace has been put into operation.

Tests made with an apparatus similar to that described have shown that practically all aluminum foils may be recovered satisfactorily by packing them to about the densities described in beds of from two to three feet deep, and heating to about 800 to 1000° F. The first stage usually requires about one and one-half to two hours. Using in the second stage a mixture of flue gas and air containing from about 5 to 8% of oxygen, preheated to about 800 to 1000° F. and passed through the foil at a rate varying from about 0.25 to 0.6 cubic foot per square foot of surface per minute, this step generally requires about four to six hours.

Backed foil treated in the manner just described is entirely freed from the backing matter, and it is of bright, clean and uniform quality. At times the foil may contain small amounts of a loose fluffy ash. Such ash may be readily separated from the foil by screening or aerating.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A process of treating coated metal foil to recover the foil, comprising distilling volatile matter from the coated foil by heating it in a non-oxidizing atmosphere, and then burning off carbonaceous matter in an oxidizing atmosphere controlled to burn said carbonaceous matter but not the metal.

2. A process of treating coated metal foil to recover the foil, comprising heating the coated foil in a non-oxidizing atmosphere to distill off the major portion of the volatile matter, and continuing the heating while circulating a gas of low oxygen content uniformly over the foil at a rate such as to burn off only residual carbonaceous matter.

3. A process of treating coated metal foil to recover the foil, comprising distilling off the major portion of the volatile matter by heating the backed foil at a temperature below the melting point of the metal in a non-oxidizing atmosphere, and then burning off the residual carbonaceous matter by heating in an atmosphere of flue gas containing oxygen regulated in amount to burn off only residual carbonaceous matter.

4. A process of recovering metallic aluminum from aluminum foil coated with non-metallic combustible material comprising distilling off volatile matter in a non-oxidizing atmosphere at an elevated temperature below the melting point of aluminum, and then supplying oxygen for combustion of residual carbonaceous matter, the oxygen concentration being adjusted to effect such combustion without burning the aluminum.

5. A process of treating paper-backed aluminum foil to recover the foil, comprising distilling off the major portion of the volatile matter between 800 to 1000° F. in a non-oxidizing atmosphere, and then supplying oxygen for combustion of the residual carbonaceous matter, the oxygen concentration being adjusted to effect such combustion without burning the aluminum.

6. A process of recovering metallic aluminum from aluminum foil coated with non-metallic combustible material comprising distilling off the major portion of the volatile matter by heating the coated foil in a non-oxidizing atmosphere at a temperature below the melting point of aluminum, and then burning off residual carbonaceous matter by continuing the heating in an atmosphere of flue gas containing oxygen regulated in amount to burn off residual carbonaceous matter without burning the aluminum.

7. A process of treating paper-backed aluminum foil to recover the foil, comprising heating the backed foil at about 800 to 1000° F. in a non-oxidizing atmosphere to distill off the major portion of volatile matter, and then burning off residual carbonaceous matter by heating at 800 to 1000° F. in an oxidizing atmosphere containing about 5 to 8% of oxygen and supplied at a rate such as to prevent burning of the aluminum.

8. A process according to claim 4, the oxygen content in said flue gas atmosphere being about 5 to 8%.

9. A process of treating paper-backed metal foil to recover said foil comprising heating the backed foil at a temperature below the melting point of the metal in a non-oxidizing atmosphere to distill off the major portion of volatile matter, then supplying air to burn off residual carbonaceous matter, and mixing said air with gases from combustion of said carbonaceous matter to restrict the combustion to said carbonaceous matter.

10. A process of treating paper-backed aluminum foil to recover the foil, comprising packing the backed foil in a container to a density of about 0.75 to 1.25 pounds of foil per cubic foot, heating the thus packed foil in a non-oxidizing atmosphere to distill off volatile matter, and then burning off residual carbonaceous matter in an oxidizing atmosphere controlled to burn said carbonaceous matter but not the aluminum.

In testimony whereof, I sign my name.

RALPH B. DERR.